(12) United States Patent
Cooper

(10) Patent No.: US 7,775,093 B2
(45) Date of Patent: Aug. 17, 2010

(54) APPARATUS FOR INDICATING LOADING IN LANDING GEAR HAVING EXCEEDED A PREDETERMINED THRESHOLD

(75) Inventor: Graham R Cooper, Trowbridge (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 12/292,988

(22) Filed: Dec. 2, 2008

(65) Prior Publication Data
US 2009/0139341 A1    Jun. 4, 2009

(30) Foreign Application Priority Data
Dec. 3, 2007    (GB)    ................... 0723506.2

(51) Int. Cl.
G01L 5/00    (2006.01)
G01L 5/28    (2006.01)
E01F 9/018    (2006.01)

(52) U.S. Cl. ................... 73/129; 403/2; 73/802
(58) Field of Classification Search .................. 73/129, 73/862.621, 788, 845, 849; 244/103 R; 188/181 T; 403/2; 33/542, 543
See application file for complete search history.

(56) References Cited

U.S. PATENT DOCUMENTS

| | | | | |
|---|---|---|---|---|
| 3,707,270 A | * | 12/1972 | Laimins | .................. 244/103 R |
| 4,392,623 A | | 7/1983 | Munsen et al. | |
| 4,474,060 A | * | 10/1984 | Crossman | .................... 73/129 |
| 6,273,613 B1 | * | 8/2001 | O'Brien et al. | ............. 384/448 |
| 6,374,956 B1 | * | 4/2002 | Naeumann et al. | ......... 188/18 A |
| 2007/0227239 A1 | * | 10/2007 | Perriard et al. | ................. 73/129 |
| 2007/0228825 A1 | * | 10/2007 | Perriard et al. | ............. 303/191 |

FOREIGN PATENT DOCUMENTS

| | | |
|---|---|---|
| EP | 0 576 815 | 1/1994 |
| GB | 2 019 711 | 11/1979 |
| GB | 2 251 696 | 7/1991 |
| GB | 2452938 A * | 3/2009 |
| WO | 91/08398 | 6/1991 |
| WO | 2004/074787 | 9/2004 |
| WO | WO 2006067442 A1 * | 6/2006 |

OTHER PUBLICATIONS

William D. Callister, "Plasticity", in AccessScience@McGraw-Hill, Accessed online on Nov. 9, 2009 <http://www.accessscience.com>, DOI 10.1036/1097-8542.526700.*
Peter M. Anderson, "Plastic deformation of metals", in AccessScience@McGraw-Hill, Accessed online on Nov. 9, 2009 <http://www.accessscience.com>, DOI 10.1036/1097-8542.526600.*
Witek, L. "Failure analysis of the wing-fuselage connector of an agriculture aircraft." Engineering Failure Analysis 13 (2006) pp. 572-581.*
Search Report for GB 0723506.2 dated Mar. 20, 2008.

* cited by examiner

Primary Examiner—Lisa M Caputo
Assistant Examiner—Punam Roy
(74) Attorney, Agent, or Firm—Nixon & Vanderhye P.C.

(57) ABSTRACT

Apparatus for indicating loading in a structure having exceeded a predetermined threshold is disclosed in which deformation of a structural element is identified by the torque required to rotate a gauge assembly integrated in the structure.

8 Claims, 4 Drawing Sheets

APPARATUS FOR INDICATING LOADING IN LANDING GEAR HAVING EXCEEDED A PREDETERMINED THRESHOLD

CROSS REFERENCE TO RELATED APPLICATION

This application is claims the benefit of British Patent Application No. 0723506.2 filed on 3 Dec. 2007, incorporated herein by reference in its entirety.

FILED OF INVENTION

The present invention relates to apparatus for indicating loading in a structure having exceeded a predetermined threshold.

BACKGROUND OF THE INVENTION

Structures in civil, aerospace, marine or automotive engineering such as bridges, aircraft, spacecraft, ships or motor vehicles are engineered to perform under predetermined conditions such as an acceptable range of operational loading of elements of their structure. If elements of the structure are overloaded the structure may need to be replaced or repaired. Since such structures are engineered to perform under a certain degree of overloading without failure, any damage or degradation caused by such overloading may not be straightforwardly identifiable. For example, the landing gear of aircraft are designed to cope with heavy landings. However, some heavy landings may results in damage in the landing gear and aircraft structure that requires repair or replacement of aircraft parts.

One solution for detecting overloading in a structure is to model the situation in which damage is thought to have occurred and to calculate the stresses on the structure and from those calculations determine whether or not any repairs or part replacements are required. In another solution, strain gauges are located on the structure and used to measure the loadings. These measurements are then used to determine whether any overloading is of a level indicating that repair or part replacement is required. One problem with these techniques is that they are highly complex processes that require significant amounts of highly skilled manpower and equipment. Thus these processes are expensive, require significant maintenance and can incur significant down time for the structure being analysed.

SUMMARY OF THE INVENTION

An embodiment of the invention provides apparatus for indicating loading in a structure having exceeded a predetermined threshold, the apparatus comprising:

a body member defining an internal space providing an internal at least partially cylindrical surface, the body member being formed at least partially from a deformable material and arranged externally to conform to one or more load bearing elements of a structure, the body member being arranged to deform from a non-deformed state to a permanently deformed state in response to loading in the load bearing elements exceeding a predetermined loading threshold;

a gauge member rotatably mounted within the internal space of the body member and arranged for rotation within the internal space by a first applied torque of up to a predetermined first applied torque threshold when the body member is in the non-deformed state and rotatable by a second applied torque exceeding a second applied torque threshold when the body member is in the permanently deformed state, wherein the second applied torque is higher than the first applied torque as a result of increased interference between the at least partially cylindrical surface of the body member in the permanently deformed state and the gauge member.

The level of applied torque may be governed by mechanical interference between the internal cylindrical surface of the body member and the or each axially distal surface of the gauge member. The first and second applied torque thresholds may be contiguous. The gauge member may comprise a cylindrical axial cross section that substantially rotatably conforms to the internal cylindrical surface of the body member in the non-deformed state. The gauge member may comprise an eccentric axial cross section.

The gauge member may be arranged with one or more interference elements extending radially towards the internal cylindrical surface of the body member and arranged for interference of their radially distal surface with the internal cylindrical surface of the body member when in the permanently deformed state. The gauge member may be arranged with a plurality of the interference elements arranged with respective tolerances between the distal surfaces and the internal cylindrical surface of the body member so as to provide a third applied torque threshold when the body member is in the permanently deformed state. The body member may be a functionally existing element of the structure.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
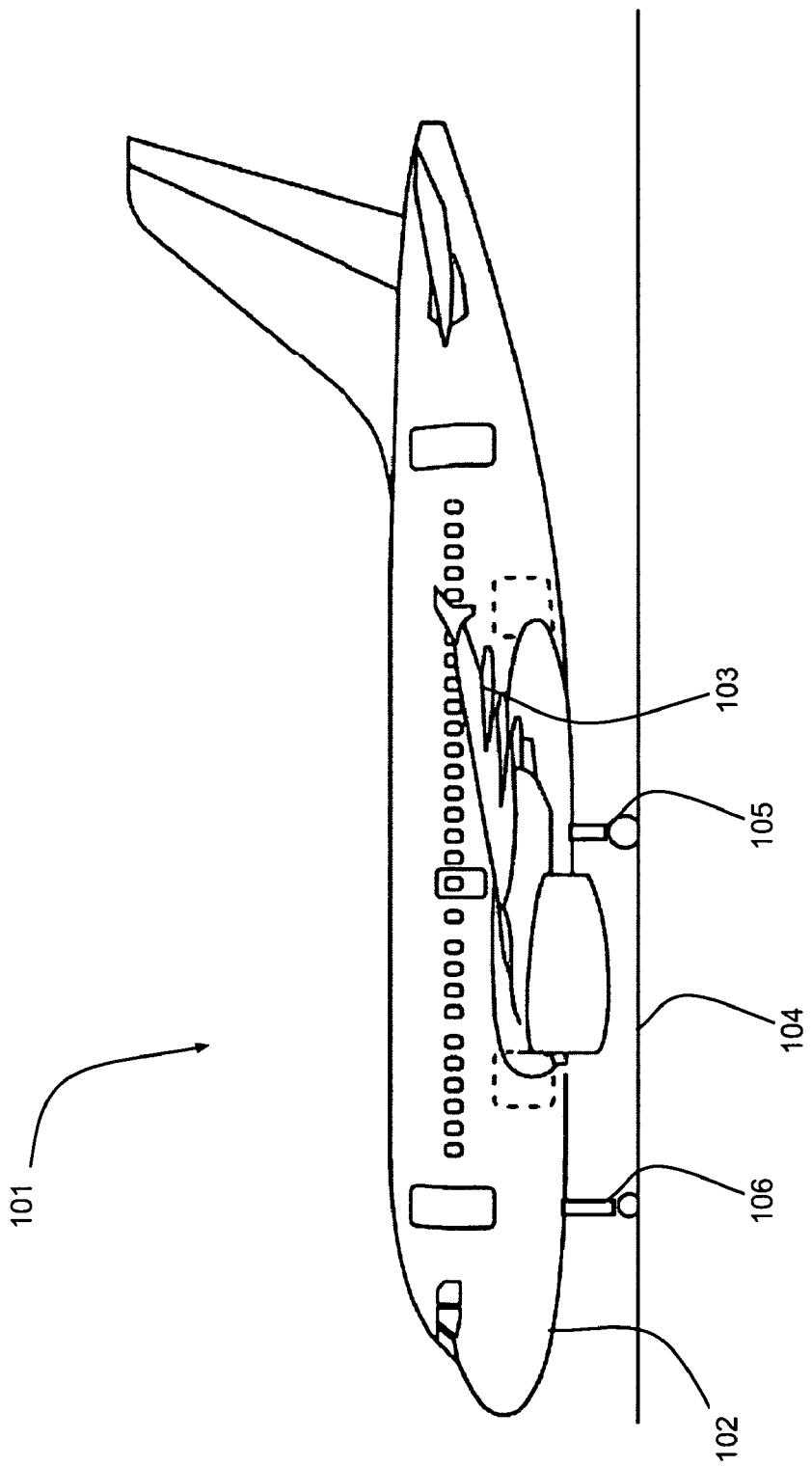
FIG. 1 is a side view of an aircraft.

With reference to FIG. 1, an engineered structure in the form of an aircraft 101 comprises a fuselage 102 and a set of wings 103 faired into the fuselage 102. The aircraft 101 is supported on the ground 104 by a set of landing gear in the form of main landing gear 105 and nose landing gear 106. The landing gear 105, 106 is arranged to be movable between a deployed position supporting the aircraft 101 on the ground 104 and a stowed position in a landing gear bay within the aircraft structure while the aircraft 101 is in flight.

Figure 2:
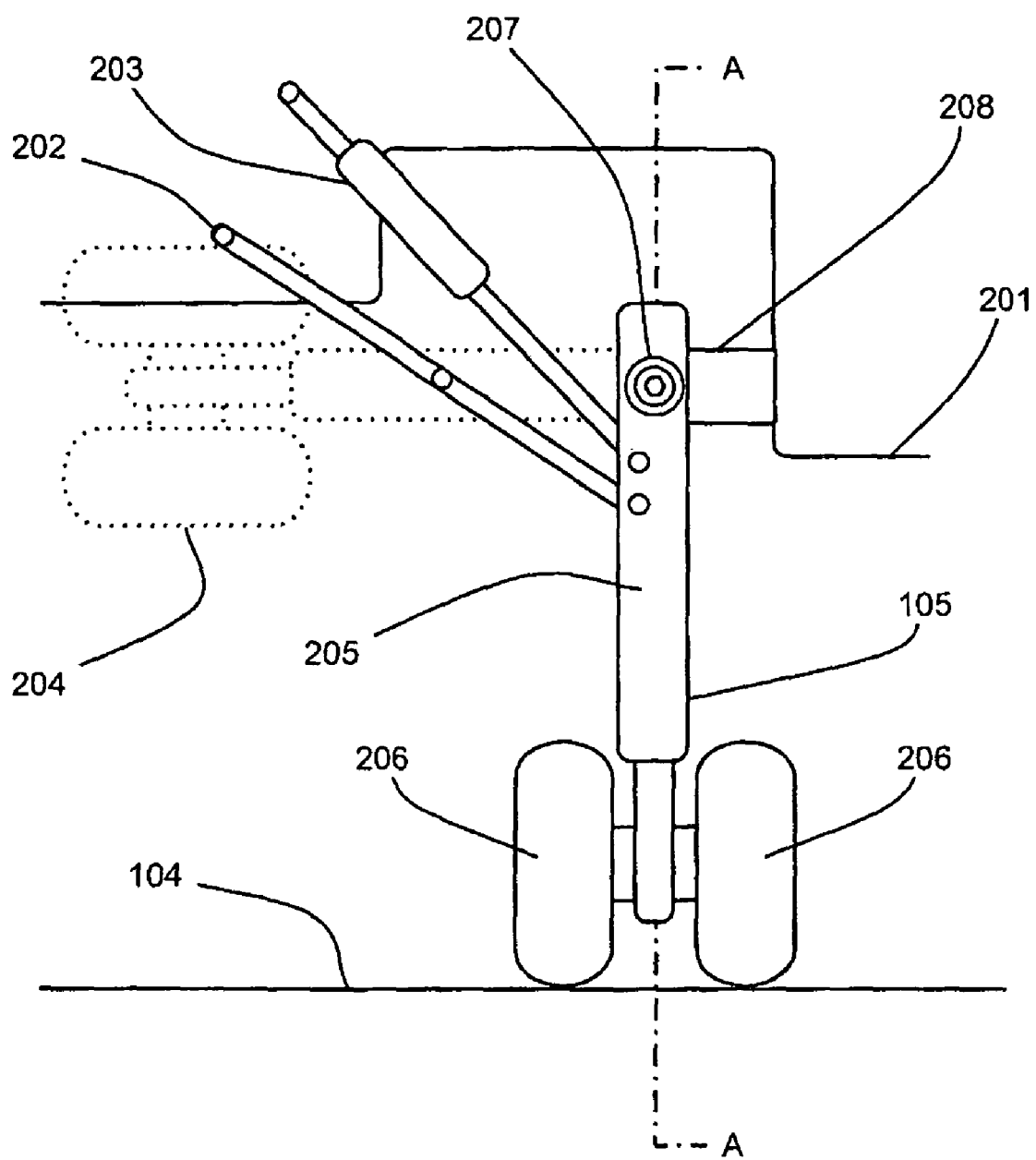
FIG. 2 is a partial sectional front view of one of the landing gear of the aircraft of FIG. 1.

FIG. 2 shows the deployed main landing gear 105 from the front in further detail. The landing gear is pivotably attached to the aircraft structure 201 and supported in the deployed position by a support strut 202. An actuator 203, in the form of a double acting cylinder, is attached between the aircraft structure 201 and the inboard end of the landing gear 105 to enable the controlled movement of the landing gear 105 between the deployed position and a stowed position 204 indicated in FIG. 2 by dotted lines. The landing gear 105 comprises a main strut 205, which forms the point of attachment at its inboard end for the actuator 203, and bears a pair of wheels 206 at its outboard end. The main strut 205 also provides pivotable attachment between the landing gear 105 and the aircraft structure 201 via a pin 207 pivotably interconnecting the main strut 205 and a beam 208 forming part of the aircraft structure 201. In the present embodiment, the pin 207 is arranged to indicate whether or not the landing gear 105 and connected aircraft structure 208 have been overloaded, for example, by a heavy landing of the aircraft 101.

Figure 3A:
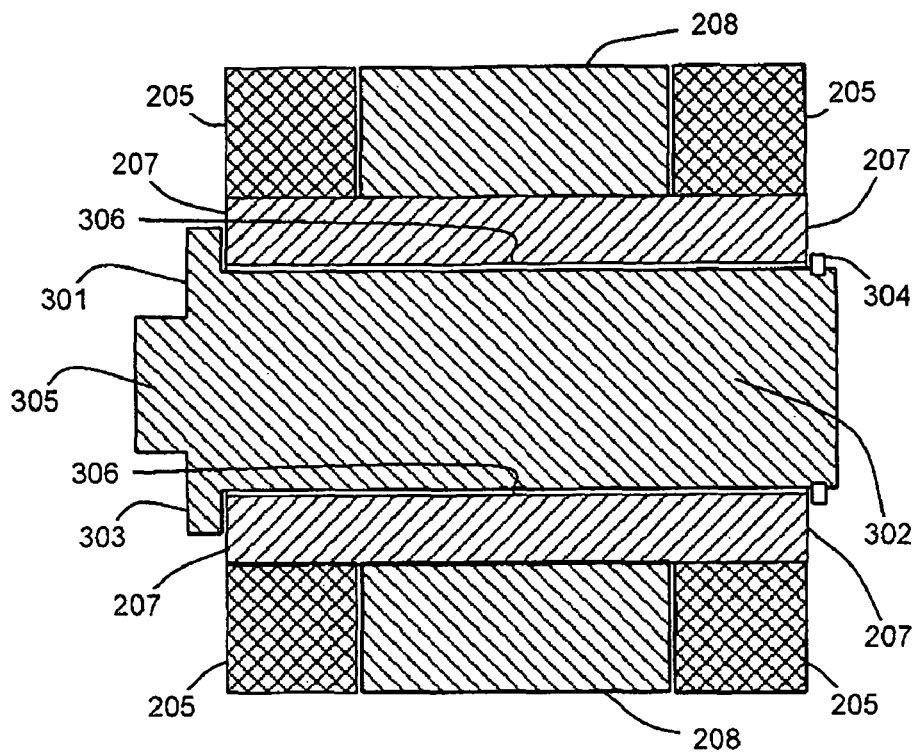
FIGS. 3a and 3b are cross sectional views along the line A-A in FIG. 2 of an apparatus for indicating loading of the landing gear.

With reference to FIG. 3a, in the present embodiment, the pin 207 is externally cylindrical and internally cylindrically hollow. A gauge member 301 is arranged within the internal cylindrical space of the pin 207 and comprises a cylindrical gauge element 302 having a circumferential flange 303 at one end and a circumferential retaining member 304 in the form of a circlip at the other end. The flange 303 and circlip 304 are arranged to hold the gauge member within the pin 207 while allowing the gauge member to rotate freely. One end of the gauge member is provided with an axially concentric hexagonal head 305 arranged to enable engagement with a tool for rotating the gauge member 301 relative to the pin 207.

The pin 207 is formed from a permanently deformable material and engineered to deform in response to a predetermined level of overloading forces in the landing gear 105 and aircraft structure 208. In response to such overloading transmitted to the pin 207 through load bearing elements, the pin 207 is arranged to deform from a non-deformed state to a deformed state. The gauge member 301 is engineered with a tolerance 306 between its outer surface and the internal surface of the pin 207. The tolerance is such that the gauge member 301 is substantially freely rotatable within the pin 207 in its non-deformed state as shown in FIG. 3a. In other words the gauge member 301 can be rotated within the pin 207 by an applied torque of up to a predetermined first applied torque threshold. The gauge 301 may be rotated by a suitable tool (not shown), which is engaged with the head 305. The tool may comprise a torque-measuring device such as a torque gauge.

Figure 3B:
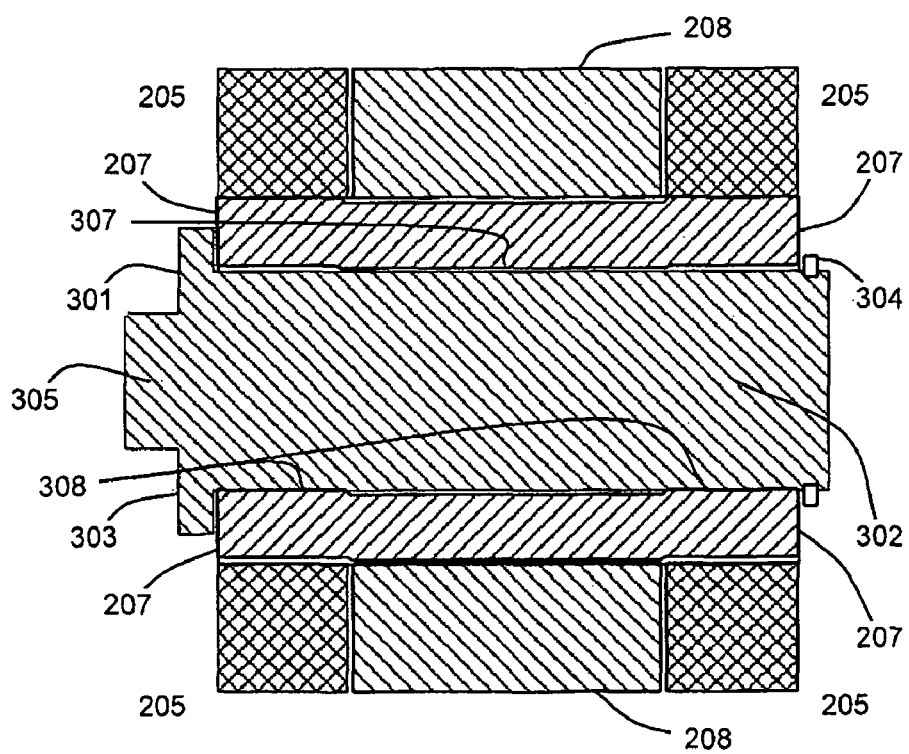

As described above, overloading the landing gear 105 and attached aircraft structure 201, 208, causes loading of the pin 207 and, if the overload exceeds the predetermined limit, the pin 207 deforms as shown in FIG. 3b. When the pin 207 is in its deformed state the tolerance 307, 308 between the internal surface of the pin 207 and the outer surface of the gauge 301 is reduced such that at least part of the respective surfaces mechanically engage or interfere. Thus, the torque required to rotate the gauge member 301 within the pin 207 is increased. The level of applied torque is governed by the degree of mechanical engagement or interference between the internal cylindrical surface of the pin 207 and the outer surface of the gauge member 301. The material and structure of the pin 207 are selected such that when the pin 207 is in its deformed state the torque required to be applied to rotate the gauge member 301 exceeds a second applied torque threshold.

After the aircraft 101 has experienced an overload situation such as a heavy landing, gauge members 301 in each set of landing gear may be operated with a torque-measuring device such as a torque wrench. If the torque required to rotate any of the gauge members 301 is less than the first threshold, this indicates that the respective pin 207 has not been loaded past the predetermined limit that denotes an overload. If the torque required to rotate any of the gauge members 301 exceeds the second threshold, this indicates that the respective pin 207 has been deformed indicating an overload. Thus the pin 207 along with other elements of the landing gear 105 or elements of the aircraft 101 may need repair or replacement.

Figure 4:
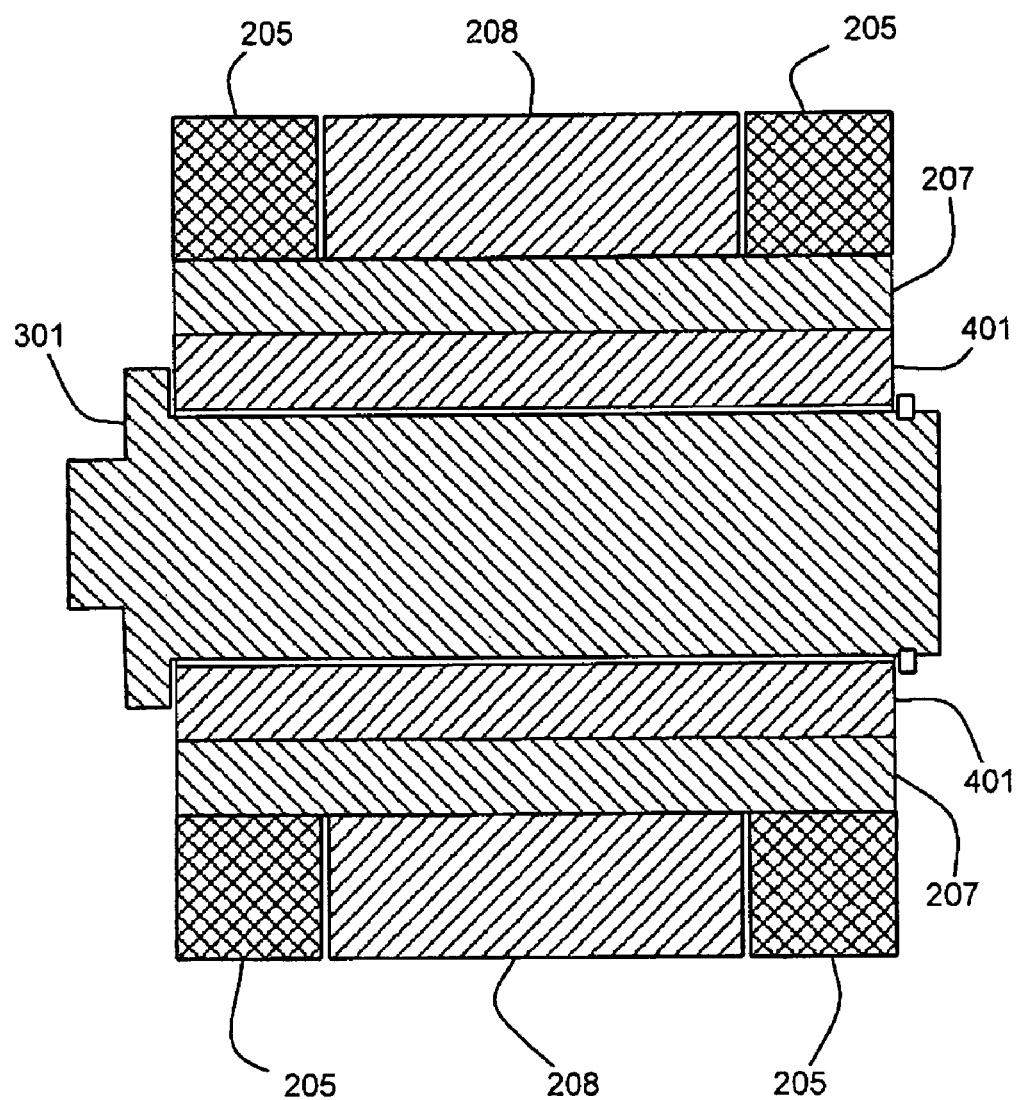
FIG. 4 is cross sectional view of another embodiment of an apparatus for indicating loading of the landing gear of FIG. 2.

In another embodiment, with reference to FIG. 4, the pin 207 is engineered so as to be deformable but fully resilient in response to overloading. In other words, the pin 207 is arranged not to maintain a deformed state after being overloaded. In the present embodiment, a gauge body member 401 is provided which is externally cylindrical so as to fit within the pin 207 and internally cylindrically hollow. The gauge member 301 is arranged within the internal cylindrical space of the gauge body member 401. The gauge body member 401 is formed from a non-resilient deformable material and engineered to deform in response to a predetermined levels of overloading forces from the landing gear 105 and aircraft structure 208 via the pin 207. In response to such overloading the gauge body member 401 is arranged to deform from a non-deformed state to a deformed state. The gauge member 301 is engineered with a tolerance 306 between its outer surface and the internal surface of the gauge body member 401. If the gauge body member 401 is overloaded, this overload is detectable by the amount of torque required to rotate the gauge member 301. In the present embodiment, the gauge member 301 and gauge body member 401 may be replaced without the need to remove the pin 207. In other words, replacement of the gauge assembly 301, 401 can be performed without necessarily dismantling the structure within which the gauge is employed.

As will be understood by those skilled in the art, overloading forces may result from different types of load or any combination of such loads. For example, in an aircraft, the overload forces on landing gear may be top loads, side loads or drag loads or any combination thereof. Thus the gauge assemblies described herein may be engineered to account for the likely types or directions of the overloading they are designed to detect.

As will be understood by those skilled in the art, in some applications it is necessary for a structural element, such as the pin described above, to maintain full structural or functional integrity after a predetermined of overload.

In another embodiment, the cross section of the gauge member perpendicular to its axis of rotation comprises an interference member such as an eccentric lobe, vane or arm. The axially distal surfaces of the interference member are arranged to mechanically engage with the internal surface of the body member, in which the gauge member is positioned, when the body member is in its deformed state as a results of being overloaded.

In a further embodiment, the cross section of the gauge member comprises a plurality of radially displaced interference members. The interference member may be arranged with different tolerances between their axially distal surfaces and the internal surface of the body member. Thus, the gauge assembly may be arranged to detect a plurality of overload thresholds. In another embodiment, the tolerance between the internal surface of the body member and the or each interference member varies along the full or part of the axial length or the respective interference member. In a further embodiment, the surfaces of the or each interference member are not continuous so that the indicating torque is not constant with rotation of the gauge member. The peak torque during such rotation is the indicating torque. In another embodiment, the gauge member comprises a hollow centre.

In further embodiment, the gauge member is arranged for rotation by hand via a fixed or removable dial, lever, or handle. The dial, lever, or handle may comprise a built-in torque gauge. The torque gauge may be arranged so as to simply provide an indication of whether an overload threshold has been exceeded. The torque gauge may provide a visual, mechanical or audible indication or whether or not one or more overload threshold have been exceeded.

In another embodiment, the gauge member is provided with seals so as to isolate the interior of the gauge body from the external environment and avoid ingress of materials that may affect the accuracy of the gauge assembly. To modify the torque characteristic for improved indication, a high-friction coating may be applied to the interference surfaces of the indicator or the housing. To reduce any effect of external contamination on torque required for moving the rotating element, surface coatings may be applied to the interference surfaces.

In further embodiment the gauge member is provided with an optimum rest position. The optimum rest position is arranged to keep the distal surface of the or each interference member free of areas of possible deformation of the gauge body member so as to reduce the risk of distortion of the gauge member. The gauge member may be biased or sprung into the optimum rest position.

As will be understood by those skilled in the art, while in the embodiments described above, the invention is employed at a landing gear pivot joint, the invention may also be applied to any suitable location or structure such as a joint of the support strut or a joint between a beam and other aircraft structure.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. Apparatus for indicating loading in a structure having exceeded a predetermined threshold, said apparatus comprising:

a body member defining an internal space providing an internal at least partially cylindrical surface, said body member being formed at least partially from a deformable material and arranged externally to conform to one or more load bearing elements of a structure, said body member being arranged to deform from a non-deformed state to a permanently deformed state in response to loading in said load bearing elements exceeding a predetermined loading threshold; and a gauge member rotatably mounted within said internal space of said body member and arranged for rotation within said internal space relative to said body member, wherein when said body member is in said non-deformed state said gauge member has a rotational resistance of up to a first threshold and when said body member is in said permanently deformed state said gauge member has a rotational resistance exceeding a second threshold, wherein said rotational resistance second threshold is higher than said rotational resistance first threshold as a result of increased mechanical interference between said gauge member and said at least partially cylindrical surface of said body member in said permanently deformed state relative to the interference between said gauge member and said at least partially cylindrical surface of said body member in said non-deformed state.

2. Apparatus according to claim 1 in which said rotational resistance is governed by mechanical interference between said internal cylindrical surface of said body member and the or each axially distal surface of said gauge member.

3. Apparatus according to claim 1 in which said first and second rotational resistance thresholds are contiguous.

4. Apparatus according to claim 1 in which said gauge member comprises a cylindrical axial cross section that substantially rotatably conforms to said internal cylindrical surface of said body member in said non-deformed state.

5. Apparatus according to claim 1 in which said gauge member comprises an eccentric axial cross section.

6. Apparatus according to claim 1 in which said gauge member is arranged with one or more interference elements extending radially towards said internal cylindrical surface of said body member and arranged for interference of their radially distal surface with said internal cylindrical surface of said body member when in said permanently deformed state.

7. Apparatus according to claim 6 in which said gauge member is arranged with a plurality of said interference elements arranged with respective tolerances between said distal surfaces and said internal cylindrical surface of said body member so as to provide a third applied torque threshold when said body member is in said permanently deformed state.

8. Apparatus according to claim 1 in which said body member is a functionally existing element of said structure.

* * * * *